United States Patent
Sano et al.

(10) Patent No.: US 7,513,944 B2
(45) Date of Patent: Apr. 7, 2009

(54) BLACK INK COMPOSITION, INK SET, RECORDING METHOD AND RECORDED MATTER

(75) Inventors: Tsuyoshi Sano, Nagano (JP); Seishin Yoshida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 408 days.

(21) Appl. No.: 10/717,315

(22) Filed: Nov. 19, 2003

(65) Prior Publication Data

US 2004/0127601 A1 Jul. 1, 2004

(30) Foreign Application Priority Data

| Nov. 28, 2002 | (JP) | ............................ P.2002-345831 |
| Nov. 28, 2002 | (JP) | ............................ P.2002-345832 |
| Jun. 13, 2003 | (JP) | ............................ P.2003-169437 |
| Jun. 13, 2003 | (JP) | ............................ P.2003-169438 |

(51) Int. Cl.
*C09D 11/10* (2006.01)
*C09D 11/02* (2006.01)
*C09D 11/00* (2006.01)

(52) U.S. Cl. .................. 106/31.6; 106/31.13; 523/160; 523/161; 524/495; 524/556; 524/582; 524/585; 524/459

(58) Field of Classification Search ................ 523/160, 523/161; 106/31.6, 31.13; 524/495, 556, 524/582, 585, 459
See application file for complete search history.

(56) References Cited

U.S. PATENT DOCUMENTS

| 6,114,411 | A | * | 9/2000 | Nakamura et al. | .......... 523/161 |
| 6,299,675 | B1 | * | 10/2001 | Ono et al. | ................ 106/31.27 |
| 6,565,202 | B2 | * | 5/2003 | Rose et al. | .................. 347/100 |
| 6,670,409 | B2 | * | 12/2003 | Yatake | ........................ 523/160 |
| 6,846,353 | B2 | * | 1/2005 | Sano et al. | ................. 106/31.6 |
| 2003/0056687 | A1 | | 3/2003 | Sano | |
| 2003/0189626 | A1 | * | 10/2003 | Kataoka et al. | ............... 347/98 |
| 2003/0226473 | A1 | * | 12/2003 | Ishimoto | .................... 106/31.6 |
| 2004/0250726 | A1 | * | 12/2004 | Mott et al. | ............... 106/31.27 |
| 2005/0039632 | A1 | * | 2/2005 | Yamamoto et al. | ....... 106/31.27 |
| 2005/0203210 | A1 | * | 9/2005 | Kataoka et al. | ............. 523/160 |

FOREIGN PATENT DOCUMENTS

| EP | 1 217 047 A | 6/2002 |
| EP | 1 219 689 A | 7/2002 |
| GB | 2 370 580 A | 7/2002 |
| JP | 6-226998 | 8/1994 |
| JP | 11-320924 | 11/1999 |
| JP | 2000 318293 A | 11/2000 |

OTHER PUBLICATIONS

Patent Abstracts of Japan Publication No. 06-226998 Published Aug. 16, 1994.
Patent Abstracts of Japan Publication No. 11-320924 Published Nov. 24, 1999.

* cited by examiner

*Primary Examiner*—Sanza L McClendon
(74) *Attorney, Agent, or Firm*—Ladas and Parry LLP (57) ABSTRACT

The present invention provides a black ink composition comprising (1) water, (2) carbon black, and (3) a fine particle emulsion, wherein (A) the content of said carbon black is less than 0.4 wt %, and wherein (B) the solid content of said fine particle emulsion is 20 times or more the content of said carbon black. Also disclosed are an ink set comprising the black ink composition, a recording method using the ink set, and recorded matter obtained by the method.

18 Claims, 1 Drawing Sheet

FIG. 1

BLACK INK COMPOSITION, INK SET, RECORDING METHOD AND RECORDED MATTER

FIELD OF THE INVENTION

The present invention relates to black ink compositions, an ink set containing the black ink compositions, a recording method using the ink set, and a recorded matter obtained by the recording method. By using the black ink compositions of the present invention, the occurrence of golden gloss on a printed matter can be effectively restrained.

BACKGROUND OF THE INVENTION

There are cases where an ink set containing two or three or more black inks each having different carbon black concentration is used for the purpose of obtaining a good black-and-white monochromatic image or a gray scale by an ink jet recording method. For instance, there are cases where a two-color ink set comprising black ink and light black ink is used as an ink set for black-and-white monochromatic image recording. Further, in an ink set for color recording, there are also cases where a four-color ink set comprising black ink, cyan ink, magenta ink and yellow ink (or a six-color ink set additionally comprising light cyan ink and light magenta ink) is made a five-color ink set (or a seven-color ink set) by further adding light black ink thereto in compliance with the requirement of increasing the quality of achromatic part (black, gray and white parts) of a color image. The light black ink is ink having lower concentration of carbon black than that of black ink and the light black ink is used for the purpose of improving the color reproduction of dark colors, e.g., a shadow part, and the gradation of gray.

For example, the stability of gray balance and the metamerism are markedly elevated by using three black inks each having different carbon black concentration. The effect is especially great in gray balance.

That is, when a gray balance is outputted by only one or two black inks, the graininess in a high tone region (a bright region) becomes a problem. For solving this graininess, there is a means of outputting color of a high tone achromatic region by the mixture of cyan ink, magenta ink and yellow ink. However, when a method of outputting color of an achromatic region by a plurality of chromatic colors is adopted, a high technique is required for controlling outputted colors and there is the risk of fluctuation in outputted colors.

The above fluctuation in outputted colors is caused by various factors. One factor of the fluctuation is the unevenness in ink weights among cyan ink (light cyan ink), magenta ink (light magenta ink) and yellow ink. That is, the variations in ink weights results in the fluctuation in outputted colors. For example, when the discharge amount of cyan ink increases by 10% and the discharge amount of yellow ink decreases by 10%, the outputted color shifts to bluish side as a whole. The ink jet printer is of course designed so as to be able to obtain absolutely the same output at any time, however, since ink is a liquid, it is influenced by a change in the environment of the outside. For instance, the viscosity of ink changes by the variation in temperature. In an ink jet method of ejecting ink from an ink jet head by the application of pressure, an ink jet amount is inevitably changed with the viscosity change of an ink liquid. In ink jet printers, a head driver is equipped with temperature compensating function for diminishing such an influence, but it is difficult to completely obviate even a small ink weight change in practice, and there is a possibility that a trace amount of change of ink weight may occur. Further, besides the fluctuation in temperature, humidity is actually a factor to outputted color variation, and recording medium (ink jet medium) also becomes the cause of delicate color change by these environmental influences.

The drawback in the method of outputting the color of a high tone region (a bright region) by a plurality of chromatic colors can be solved by using third black ink having low carbon black concentration. That is, when third black ink having low carbon black concentration is used, a hue of an achromatic color is not influenced even when there arises variation in ink jet amount, as a result, a hue is stabilized.

Black ink is the highest in the visibility of dots. For reducing the dot visibility in a high tone region, it is necessary to reduce the concentration of carbon black contained in the ink. On the other hand, for representing "blackish" surely, it is also necessary to retain carbon black concentration at a certain level or higher. Therefore, ink having the concentration by which dots are invisible to the eye (or difficult to see) and ink having carbon black concentration capable of surely representing a blackish color are necessary. In this point of view, since it is difficult to represent medium gradation with only two kinds of black inks, ink of medium concentration is necessary. As has been described, an ink set comprising three or more kinds of black inks including black ink of low carbon black concentration and black ink of medium concentration is very significant.

However, reports of the results of studies on the effects and defects in cases of performing recording by using ink sets comprising two or three or more kinds of black inks are hardly known up to the present.

For instance, the examples of image-recording apparatus using a plurality of ink compositions each having different concentration and recording heads are disclosed in JP-A-6-226998 (the term "JP-A" as used herein means an "unexamined published Japanese patent application"). However, the above publication only discloses the example of a recording apparatus equipped with black, yellow, magenta and cyan inks each having different concentrations of two to four kinds respectively.

Moreover, an image-recording apparatus using a plurality of black ink compositions each having different carbon black concentration in combination with ink sets of color ink compositions and the controlling method thereof are disclosed in JP-A-11-320924. However, the technique disclosed in the above publication aims at forming a monochromatic image of high gradation on the same recording medium separately from a color image, and to use a plurality of black ink compositions for forming the monochromatic high gradation image is merely disclosed in the publication.

SUMMARY OF THE INVENTION

Under these circumstances, the present inventor studied the effects and defects in cases of performing recording by using an ink set comprising two or more kinds (in particular three kinds) of black ink compositions. As a result of the studies, it was found that when a printed image obtained by recording with a black ink composition having low carbon black concentration reflects the light of a fluorescent lamp or the outside light, the reflected light glistens in gold. The present inventor named this phenomenon "golden gloss". That is, golden gloss is a phenomenon that a region printed with a black ink composition having low concentration partially glistens in gold when the observing angle of an observer to the recorded image printed on a recording medium is changed or the illuminating angle of a light source is changed, and it becomes very difficult to discriminate even the tone of a recorded matter and the outline of an image when golden gloss occurs.

As a result of extensive studies on a means to prevent or restrain golden gloss from occurring, the present inventor found that the occurrence of golden gloss can be actually solved by adding more than a specific amount of fine particle emulsion to an ink composition. The present invention is based on this knowledge.

Accordingly, an object of the present invention is to provide a black ink composition which prevents or restrains the occurrence of golden gloss, and an ink set which prevents or restrains the occurrence of golden gloss.

The present inventor further studied the effects and defects in cases of performing recording by using an ink set comprising two or more kinds (in particular three kinds) of black ink compositions. As a result of the studies, it was found that when printing is performed by using a black ink composition for medium gradation to express medium gradation, the lightness of gray in a recorded image partially shifts. The present inventor named this phenomenon "phase shift". Phase shift is a phenomenon that the lightness of gray partially shifts in a region printed with a black ink composition for medium gradation when the observing angle of an observer to the recorded image printed on a recording medium is changed or the illuminating angle of a light source is changed, and the original gray is observed as a state to be shifted to the black side or white side. It becomes very difficult to discriminate even the outline of an image due to shifting of the lightness of a printed matter when phase shift occurs.

As a result of eager studies on a means to prevent or restrain phase shift from occurring, the present inventor found the occurrence of phase shift can be actually solved by adding more than a specific amount of fine particle emulsion to an ink composition.

Accordingly, another object of the present invention is to provide an ink set which prevents or restrains not only the occurrence of golden gloss but also the occurrence of phase shift.

Other objects and effects of the invention will become apparent from the following description.

The above objects of the present invention can be solved by a black ink composition comprising (1) water, (2) carbon black, and (3) a fine particle emulsion, wherein (A) the content of the carbon black is less than 0.4 wt %, and wherein (B) the solid content of the fine particle emulsion is 20 times or more the content of the carbon black.

According to a preferred embodiment of the present invention, the content of the carbon black is 0.01 wt % or more.

According to another preferred embodiment of the present invention, the composition contains, as the fine particle emulsion, a polyalkylene emulsion and/or an emulsion containing a pH-adjusted resin as the resin component, which is obtained by adjusting the pH of a copolymer having an acid value of 40 or less, with an inorganic base, obtained by polymerizing an ethylenically unsaturated carboxylic acid monomer and other monomer copolymerizable with the ethylenically unsaturated carboxylic acid monomer in the presence of an alcoholic hydroxyl group-containing water-soluble polymer compound or a copolymerizable surfactant.

According to another preferred embodiment of the present invention, the inorganic base used for preparing the pH-adjusted resin is an alkali metal hydroxide or an alkaline earth metal hydroxide.

According to another preferred embodiment of the present invention, the alcoholic hydroxyl group-containing water-soluble polymer compound used for preparing the pH-adjusted resin is a vinyl alcohol polymer.

According to a still further preferred embodiment of the present invention, the ethylenically unsaturated carboxylic acid monomer used for preparing the pH-adjusted resin is an acrylic acid or a methacrylic acid.

According to a still further preferred embodiment of the present invention, the monomer copolymerizable with the ethylenically unsaturated carboxylic acid monomer used for preparing the pH-adjusted resin is an ethylenically unsaturated carboxylate monomer.

According to a still further preferred embodiment of the present invention, the pH of the emulsion containing the pH-adjusted resin as the resin component is from 8 to 11, and more preferably from 9 to 11.

According to a still further preferred embodiment of the present invention, the content of the pH-adjusted resin is from 0.01 to 10 wt % on the basis of the total weight of the black ink composition.

According to a preferred embodiment of the present invention, the solid content of the polyalkylene emulsion is from 0.5 to 10 wt % on the basis of the total weight of the black ink composition.

According to a preferred embodiment of the present invention, the polyalkylene emulsion is a polyethylene emulsion or a polypropylene emulsion.

According to another preferred embodiment of the present invention, the total content of the solids content of the pH-adjusted resin and the polyalkylene emulsion is from 0.5 wt % to 20 wt % on the basis of the total weight of the black ink composition.

According to another preferred embodiment of the present invention, the black ink composition further contains a complementary colorant.

The black ink composition of the present invention is an ink composition for ink jet recording.

The present invention also relates to an ink set containing the above black ink composition and a black ink composition having higher concentration of carbon black and being darker than the above black ink composition. The ink set preferably contains a black ink composition for medium gradation containing carbon black in an amount of from 0.4 wt % to 1.5 wt % on the basis of the total weight of the black ink composition for medium gradation (preferably comprising at least one of a composition having a concentration of from 0.4 to 1 wt % and a composition having a concentration of from 1 to 1.5 wt %), and a darker black ink composition containing carbon black in an amount of from 1.5 wt % to 10 wt % on the basis of the total weight of the black ink composition.

Further, it is preferred that the black ink composition for medium gradation in the ink set contains a fine particle emulsion, and the solid content of the fine particle emulsion is 2 times or more the content of the carbon black. The ink set preferably contains, as the fine particle emulsion, the polyalkylene emulsion and/or the emulsion containing the pH-adjusted resin as the resin component.

The present invention also relates to a recording method of performing recording by ejecting the droplets of an ink composition and adhering the droplets on a recording medium by using the ink set.

The present invention also relates to a recorded matter which is recorded by the recording method.

DETAILED DESCRIPTION OF THE INVENTION

As described above, "golden gloss" (hereinafter sometimes referred to as "GG") is a phenomenon that a region printed with a black ink composition having low concentration partially glistens in gold when the observing angle of an observer to the recorded image printed on a recording medium is changed or the illuminating angle of a light source is changed. According to the studies by the present inventor, golden gloss occurs only at a specific region. When golden gloss occurs, it becomes very difficult to discriminate the tone of a recorded matter and even the outline of an image not only in the region where gloss occurred but in the vicinity.

The region where golden gloss occurs is described below with reference to FIG. 1. As typically shown in FIG. 1, a gray scale from black to white can be pertinently formed by varying the use proportion of dark black ink composition K1, black ink composition for medium gradation K2 and light black ink composition K3. The stability of gray balance and the metamerism can be markedly elevated by using three kinds of black ink compositions K1, K2 and K3 like this. However, as is shown in "GG-occurring region" (golden gloss-occurring region) in FIG. 1, golden gloss occurs mainly in a region recorded with light black ink composition K3.

"GG-occurring region" comes up to gray level of from about 90 to about 160 with gray level of from about 100 to about 140 as the center of the region (gray level 0 is taken as absolute black and gray level 255 as absolute white). Further, the extent of the lightness of "GG-occurring region" comes up to gray level of from about 40 to about 70 with level of from about 50 to about 60 as the central region.

When a black-and-white monochromatic image is recorded with two or more black ink compositions, the black ink composition used to record GG-occurring region is a black ink composition of relatively low concentration containing carbon black generally in an amount of less than 0.4 wt % (in particular, 0.01 wt % or more and less than 0.4 wt %) on the basis of the total weight of the black ink compositions.

The present invention aims at solving the phenomenon, found by the present inventor, which occurs when a plurality of black ink compositions are used. That is, the present invention provides a black ink composition which can prevent or reduce the occurrence of GG. In an ink set comprising a plurality of black ink compositions, by adding more than a specific amount of fine particle emulsion, to restrain or prevent golden glass, to a black ink composition containing carbon black in an amount of less than 0.4 wt % (in particular, 0.01 wt % or more and less than 0.4 wt %) on the basis of the total weight of the compositions, the occurrence of GG is prevented or reduced.

On the other hand, as described above, phase shift is a phenomenon that the lightness of gray partially shifts in a region printed with a black ink composition for medium gradation when the observing angle of an observer to the recorded image printed on a recording medium is changed or the illuminating angle of a light source is changed, and the original gray is observed as a state to be shifted to the black side or white side. When phase shift occurs in a region, the region is observed as lighter gray or darker gray than the original gray, or completely black, thus it becomes very difficult to discriminate even the outline of an image due to shifting of the lightness of a printed matter. Such a phenomenon is liable to occur particularly when an image is recorded on a glossy or semi-glossy recording medium, and it does not relatively occur in the case of a matt recording medium.

Figure 1:
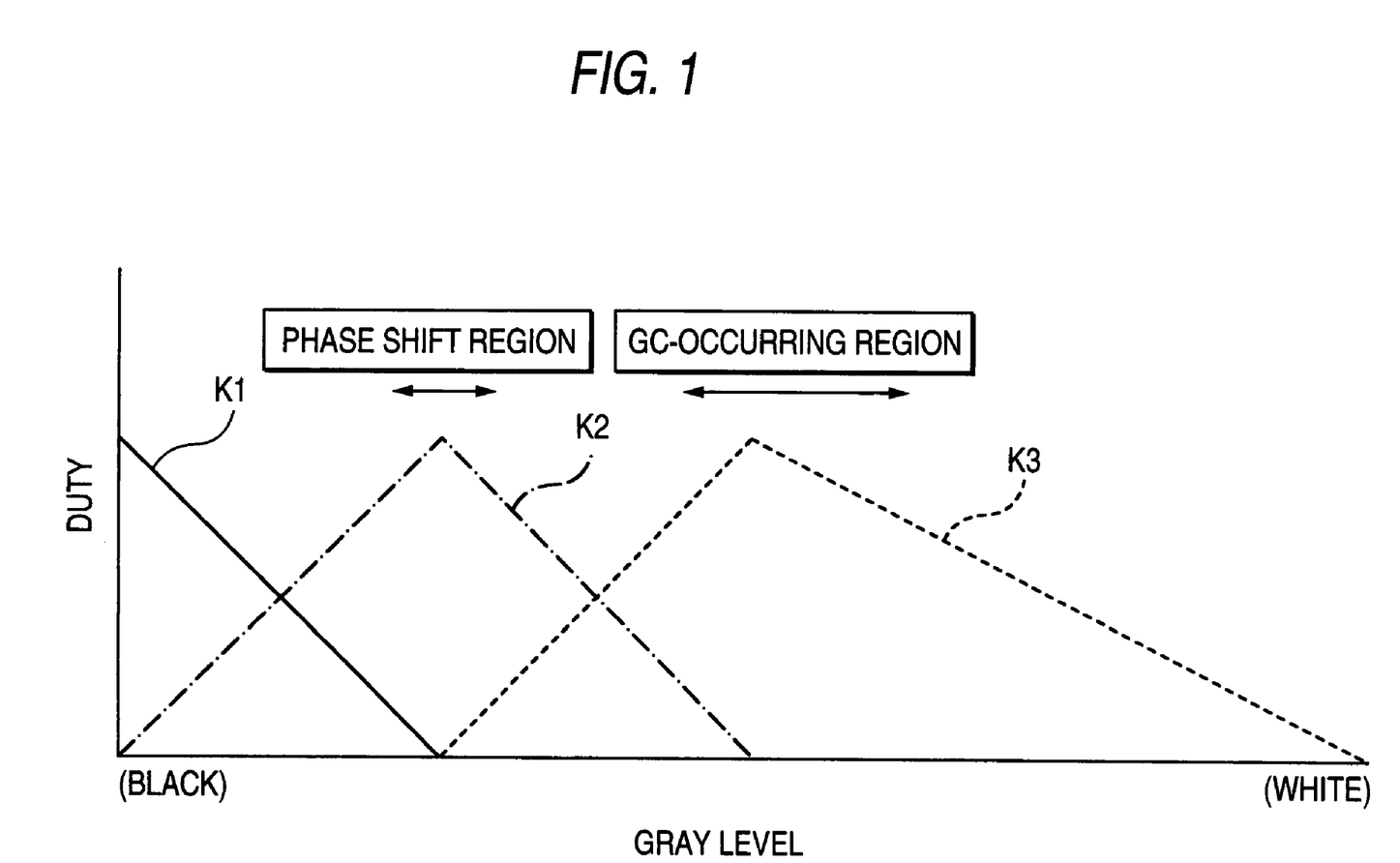
FIG. 1 is a graph typically showing the region where golden gloss (GG) occurs and the region where phase shift occurs, when a gray scale is printed with three kinds of black ink compositions.

As shown in "phase shift-occurring region" in FIG. 1, the region where phase shift occurs is primarily a region printed with black ink composition for medium gradation K2. "Phase shift-occurring region" comes up to gray level of from about 30 to about 60 with gray level of from about 35 to about 55 as the center of the region (gray level 0 is taken as absolute black and gray level 255 as absolute white). Further, the extent of the lightness of "phase shift-occurring region" comes up to gray level of from about 20 to about 35 with level of from about 25 to about 30 as the central region.

When a black-and-white monochromatic image is recorded with two or more black ink compositions, the black ink composition used to record phase shift-occurring region is a black ink composition for medium gradation containing carbon black in an amount of from 0.4 wt % to 1.5 wt % on the basis of the total weight of the black ink composition.

In another point of view, the present invention aims at solving at the same time a plurality of phenomena (i.e., golden gloss and phase shift), found by the present inventor, which occur when a plurality of black ink compositions are used. That is, the present invention provides an ink set capable of obtaining a recorded image in which golden gloss and phase shift can be prevented or diminished simultaneously. In an ink set comprising a plurality of black ink compositions, (1) by adding more than a specific amount of fine particle emulsion, to restrain or prevent golden gloss, to a composition containing carbon black in an amount of less than 0.4 wt % (in particular, 0.01 wt % or more and less than 0.4 wt %) on the basis of the total weight of the compositions, at the same time (2) by adding more than a specific amount of fine particle emulsion, to restrain or prevent phase shift, to a composition containing carbon black in an amount of from 0.4 to 1.5 wt % on the basis of the total weight of the compositions, golden glass and phase shift are prevented or diminished simultaneously.

The fine particle emulsion contained in the black ink composition of the present invention for preventing golden gloss is an aqueous system dispersion comprising water as the dispersing medium and polymer fine particles as the dispersed phase. The minimum film-forming temperature (MFT) of the polymer fine particles contained in the fine particle emulsion is not especially restricted but is preferably 25° C. or less, more preferably from 0 to 25° C., and still more preferably from 10 to 20° C. MFT is measured according to JIS K 6800. By printing on a recording medium with the ink composition of the present invention containing an emulsion having MFT in the above range, a protective film for covering the printed surface under room temperature is automatically formed.

The solid content of the fine particle emulsion in the black ink composition for preventing golden gloss may be arbitrary so long as the concentration is 20 times or more the concentration of the carbon black, and is generally from 0.2 to 20 wt % on the basis of the total weight of the black ink composition for preventing golden gloss, preferably from 0.5 to 15 wt %, and more preferably from 1 to 8 wt %.

On the other hand, when the ink set of the present invention contains a black ink composition for preventing phase shift, the fine particle emulsion contained in the black ink composition is also an aqueous system dispersion comprising water as the dispersing medium and polymer fine particles as the dispersed phase. The minimum film-forming temperature (MFT) of the polymer fine particles contained in the fine particle emulsion is also not especially restricted, but is preferably 25° C. or less, more preferably from 0 to 25° C., and still more preferably from 10 to 20° C.

The solid content of the fine particle emulsion in the black ink composition for preventing phase shift may be arbitrary so long as the concentration is 2 times or more the concentration of the carbon black, and is generally from 0.8 to 10 wt % on the basis of the total weight of the black ink composition for preventing phase shift, preferably from 1 to 8 wt %, and more preferably from 1.5 to 5 wt %.

The glass transition temperature (Tg) of the polymer fine particles contained in the fine particle emulsion is preferably from −15 to 10° C. for adjusting the MFT of the emulsion to the above range, and more preferably from −5 to 5° C. Tg is measured according to JIS K 6900.

As another method to adjust the MFT of the emulsion to the above range, a method of using commercially available MFT depressants can be exemplified.

From the viewpoint of dispersion stability in an ink composition, the polymer fine particles preferably have an average particle size of from 5 to 200 nm, more preferably from 5 to 100 nm.

The polymer fine particles comprising a hydrophilic part and a hydrophobic part are preferably used.

The structure of the polymer fine particles may be single structure or multiple structure (core-shell structure). The structure comprising two or more different polymers present in separate phases from each other will suffice for the core-shell structure. For example, the core-shell structure may be any of the structure comprising a shell part completely covering the core part, the structure comprising a shell part partially covering the core part, the structure comprising a shell part and a core part wherein a part of the shell part polymer forms a domain in the core part polymer, or the structure may be multilayer structure comprising three or more layers and one layer having different composition may intervene between the core part and the shell part.

When the polymer fine particles having the core-shell structure are used as the polymer fine particles, polymers comprising the core part having epoxy groups and the shell part having carboxyl groups are preferably used. Since the epoxy groups of core part and the carboxyl groups of shell part are bonded and form network structure at film-forming time by using such fine particles in an ink composition, the strength of the protective film can be improved.

In addition, the polymer fine particles comprising the structure derived from an unsaturated vinyl monomer having a carboxyl group in proportion of from 1 to 10 wt %, and the structure crosslinked with a crosslinkable monomer having preferably 2 or more, more preferably 3 or more, polymerizable double bonds (the structure derived from a crosslinkable monomer) in proportion of from 0.2 to 4 wt % are preferred. By using such polymer fine particles in an ink composition, the surface of a nozzle plate is hardly wetted due to the ink, so that the flying curve of the ink droplet can be prevented and ejection stability can be further improved.

As the examples of the unsaturated vinyl monomers having a carboxyl group, acrylic acid, methacrylic acid, itaconic acid, fumaric acid and maleic acid are exemplified, and methacrylic acid is particularly preferred.

The examples of the crosslinkable monomers include diacrylate compounds, e.g., polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis (4-acryloxypropyloxyphenyl)propane, and 2,2-bis(4-acryloxy-diethoxyphenyl)propane; triacrylate compounds, e.g., trimethylolpropane triacrylate, trimethylolethane triacrylate and tetramethylolmethane triacrylate; tetraacrylate compounds, e.g., ditrimethylol tetraacrylate, tetramethylolmethane tetraacrylate, and pentaerythritol tetraacrylate; hexaacrylate compounds, e.g., dipentaerythritol hexaacrylate; dimethacrylate compounds, e.g., ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipolypropylene glycol dimethacrylate, polypropylene glycol dimethacrylate, polybutylene glycol dimethacrylate, and 2,2'-bis(4-methacryloxydiethoxyphenyl)propane; trimethacrylate compounds, e.g., trimethylolpropane trimethacrylate and trimethylolethane trimethacrylate; methylenebisacrylamide and divinylbenzene.

The polymer fine particles are contained in the ink composition according to the present invention as the emulsion, and the emulsion can be manufactured by well-known emulsion polymerization methods. For instance, the emulsion of the polymer fine particles is manufactured by emulsion-polymerizing an unsaturated vinyl monomer in water in the presence of a surfactant (an emulsifier), a polymerization catalyst, a polymerization initiator, a molecular weight-conditioner, a neutralizer and the like.

As the unsaturated vinyl monomers (the constituent monomers of the polymer fine particles), those which are generally used in emulsion polymerization, e.g., acrylate monomers, methacrylate monomers, aromatic vinyl monomers, vinyl ester monomers, vinyl cyanogen compound monomers, halide monomers, olefin monomers and diene monomers are exemplified. The specific examples include acrylates, e.g., methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate and glycidyl acrylate; methacrylates, e.g., methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate and glycidyl methacrylate; vinyl esters, e.g., vinyl acetate; vinyl cyanogen compounds, e.g., acrylonitrile; halide monomers, e.g., vinylidene chloride and vinyl chloride; aromatic vinyl monomers, e.g., styrene, 2-methylstyrene, vinyltoluene, tert-butylstyrene, chlorostyrene, vinyl anisole and vinyl naphthalene; olefins, e.g., ethylene, propylene and isopropylene; dienes, e.g., butadiene and chloroprene; and vinyl monomers, e.g., vinyl ether, vinyl ketone and vinylpyrrolidone.

As the surfactants, e.g., anionic surfactants (e.g., sodium dodecylbenzenesulfonate, sodium laurate, and ammonium salt of polyoxyethylene alkyl ether sulfate), and nonionic surfactants (polyoxyethylene alkyl ether, polyoxyethylene alkyl ester, polyoxyethylene sorbitan fatty acid ester, polyoxyethylene alkylphenyl ether, polyoxyethylene alkylamine, and polyoxyethylene alkylamide) are exemplified, and these surfactants can be used alone, or they can be used in combination of two or more. In addition, acetylene glycol (Olefin Y, Sarfinol 82, 104, 440, 465 and 485, the products of Air Products and Chemicals Inc.) can also be used.

In manufacturing the above emulsion (the polymer fine particles), for improving printing stability, it is preferred to blend one or two or more compounds selected from the group consisting of acrylamides and hydroxyl group-containing monomers at the time of emulsion polymerization, besides the unsaturated vinyl monomers. As the acrylamides, e.g., acrylamide and N,N'-dimethylacrylamide are exemplified, and these acrylamides can be used alone or two or more in combination. As the hydroxyl group-containing monomers, e.g., 2-hydroxyethyl acrylate, 2-hydroxyethyl methacrylate, and 2-hydroxypropyl methacrylate are exemplified, and these monomers can be used alone, or two or more monomers may be used in combination.

When the polymer fine particles having the core-shell structure are used as the polymer fine particles, an emulsion containing the core-shell type polymer fine particles can be manufactured by using the method disclosed, e.g., in JP-A-4-76004 (the multistage emulsion polymerization of the unsaturated vinyl monomers).

As described above, the core parts of the polymer fine particles having the core-shell structure preferably comprise a polymer having epoxy groups. Epoxy groups can be introduced into the core part by a method of copolymerizing a vinyl monomer having epoxy groups, e.g., glycidyl acrylate, glycidyl methacrylate or allyl glycidyl ether, with other unsaturated vinyl monomer, alternatively when core parts (core particles) are formed by polymerization of one or more kinds of unsaturated vinyl monomers, a method of adding an epoxy compound at the same time and making them to a complex compound can be used. The former method is particularly preferred for the easiness of polymerization and polymerization stability.

The solid content of the fine particle emulsion in the black ink composition for preventing golden gloss of the present invention is 20 times or more the content of the carbon black. The upper limit is not particularly restricted but if the solid content is 50 times or more the content of the carbon black, there are cases where ejection defect arises. When the content of the fine particle emulsion is less than 20 times the content of the carbon black, golden gloss cannot be sufficiently restrained.

Further, when the ink set of the present invention contains the black ink composition for preventing phase shift, the solid content of the fine particle emulsion in the black ink composition for preventing phase shift is 2 times or more the content of the carbon black. The upper limit is not particularly restricted but if the solid content is 10 times or more the content of the carbon black, there are cases where ejection defect arises. When the content of the fine particle emulsion is less than 2 times the content of the carbon black, phase shift cannot be sufficiently restrained.

As the resin component of the fine particle emulsion, e.g., a pH-adjusted resin can be used, which is obtained by polymerizing an ethylenically unsaturated carboxylic acid monomer and other monomer copolymerizable with the ethylenically unsaturated carboxylic acid monomer in the presence of an alcoholic hydroxyl group-containing water-soluble polymer compound or a copolymerizable surfactant, and adjusting the pH of the above-obtained copolymer having an acid value of 40 or less (hereinafter referred to as "an alkali-soluble copolymer") with an inorganic base.

The content of the pH-adjusted resin in the black ink composition for preventing golden gloss of the present invention may be from 0.01 to 10 wt % on the basis of the total weight of the black ink composition, preferably from 0.5 to 5 wt %, and more preferably from 1 to 3 wt %. However, when the content of the pH-adjusted resin is 5 wt % or more, there is a case where the tints of a printed matter vary from just after printing, although the restraining effect of GG remains invariable.

When the ink set of the present invention contains a black ink composition for preventing phase shift, the content of the pH-adjusted resin in the black ink composition for preventing phase shift may also be from about 0.01 to about 10 wt % on the basis of the total weight of the black ink composition, preferably from about 0.5 to about 5 wt %, and more preferably from about 0.1 to about 1 wt %.

The alcoholic hydroxyl group-containing water-soluble polymer compounds which are used for preparing the alkali-soluble copolymers are compounds having from 5 to 25 hydroxyl groups per molecular weight of 1,000 among water-soluble polymer compounds, such as vinyl alcohol polymers, e.g., polyvinyl alcohol and various modified products of polyvinyl alcohol; saponified products of the copolymers of vinyl acetate with acrylic acid, methacrylic acid, or maleic acid; cellulose derivatives, e.g., alkyl cellulose, hydroxyalkyl cellulose and alkylhydroxyalkyl cellulose; starch derivatives, e.g., alkyl starch, carboxymethyl starch and oxide starch; gum arabic, tragacanth; and polyalkylene glycol can be exemplified as the alcoholic hydroxyl group-containing water-soluble polymer compounds. Of these compounds, vinyl alcohol polymers are preferred for the reason that industrially stable quality is easily available.

The weight average molecular weight of the alcoholic hydroxyl group-containing water-soluble polymer compounds is not particularly restricted but the molecular weight is generally from 1,000 to 500,000, preferably from 2,000 to 300,000. When the molecular weight is smaller than 1,000, dispersion stability sometimes lowers, while when it is greater than 500,000, the viscosity becomes too high for performing polymerization in the presence of this polymer compound and there is a case where polymerization is difficult.

The amount of the alcoholic hydroxyl group-containing water-soluble polymer compounds which are used for preparing the alkali-soluble copolymers is generally from 0.05 to 20 weight parts per 100 weight parts of the monomer, preferably from 1 to 10 weight parts. When the amount is less than 0.05 weight parts, agglomerates are generated in polymerization, since dispersion stability lowers, when the amount is more than 20 weight parts, contrary to this, the viscosity in polymerization becomes too high and there is a case where polymerization is difficult.

In addition, in manufacturing the alkali-soluble copolymers, it is preferred not to use surfactants generally used in emulsion polymerization, but when surfactants are used, the amount of surfactants is generally less than 0.05 weight parts per 100 weight parts of all the monomers used in the synthesis of the alkali-soluble copolymers. When the amount of surfactants increases, the obtained image is liable to be inferior in water resistance.

The ethylenically unsaturated carboxylic acid monomers which are used for manufacturing the alkali-soluble copolymers are not especially limited, and the examples include ethylenically unsaturated monocarboxylic acid monomers, e.g., acrylic acid and methacrylic acid; ethylenic unsaturated polyvalent carboxylic acid monomers, e.g., itaconic acid, maleic acid, fumaric acid, and butene tricarboxylic acid; partial ester monomers of ethylenically unsaturated polyvalent carboxylic acid, e.g., monobutyl fumarate, monobutyl maleate, and mono-2-hydroxypropyl maleate; and polyvalent carboxylic anhydrides, e.g., maleic anhydride and citraconic anhydride. These monomers may be used alone, or two or more monomers may be used in combination. Of these ethylenically unsaturated acid monomers, ethylenically unsaturated monocarboxylic acid such as (meth)acrylic acid is preferred and methacrylic acid is more preferred.

The amount of ethylenically unsaturated carboxylic acid monomers used is computed so that the acid value of the alkali-soluble copolymers become 40 or less, preferably from 10 to 40, and more preferably from 30 to 40. When the use amount calculated in terms of the acid value of the alkali-soluble copolymers exceeds 40 or less than 10, the quality of the obtained image sometimes deteriorate.

The ethylenically unsaturated carboxylic acid monomers and other monomers copolymerizable with the ethylenically unsaturated carboxylic acid monomers which can be used for manufacturing the alkali-soluble copolymers are not particularly limited, and the examples include aromatic vinyl monomers, e.g., styrene, alpha-methylstyrene, vinyltoluene and chlorostyrene; ethylenically unsaturated carboxylate monomers, e.g., methyl (meth)acrylate, ethyl (meth)acrylate, propyl (meth)acrylate, butyl (meth)acrylate, isobutyl (meth)acrylate, n-amyl (meth)acrylate, isoamyl (meth)acrylate, n-hexyl (meth)acrylate, 2-ethylhexyl (meth)acrylate, n-octyl (meth)acrylate, 2-hydroxyethyl (meth)acrylate, hydroxypropyl (meth)acrylate, and glycidyl (meth)acrylate; ethylenically unsaturated nitrile monomers, e.g., (meth)acrylonitrile; ethylenically unsaturated glycidyl ether monomers, e.g., allyl glycidyl ether; ethylenically unsaturated amide monomers, e.g., (meth)acrylamide, N-methylol (meth)acrylamide, and N-butoxymethyl (meth)acrylamide; conjugated diene monomers, e.g., 1,3-butadiene, isoprene, 2,3-dimethyl-1,3-butadiene and 1,3-pentadiene; and carboxylic acid vinyl ester, e.g., vinyl acetate. These monomers can be used alone or in combination of two or more. Of these monomers, ethylenically unsaturated carboxylate monomers are preferred for being excellent in light fastness and glossiness of the obtained images, and methyl methacrylate and ethyl acrylate are more preferred.

An alkali-soluble copolymer can be obtained by polymerizing the above monomer mixture, preferably in aqueous medium, in the presence of an alcoholic hydroxyl group-containing water-soluble polymer compound. At this time, these alcoholic hydroxyl group-containing water-soluble polymer compound and monomer mixture can be added to a reaction vessel at one time en bloc before initiating polymerization, or a part of them may be added before initiating polymerization and the remainder may be added after initiating polymerization little by little in parts or, alternatively, the remainder may be added continuously. When they are added dividedly or continuously, each amount added may be uniform or definite, or the amount may be varied in accordance with the stage of progress of polymerization.

The alcoholic hydroxyl group-containing water-soluble polymer compound and the monomer mixture may be added respectively separately, or they may be added in the form of the dispersed product of monomer obtained by blending the alcoholic hydroxyl group-containing water-soluble polymer compound, the monomer mixture and water. When the alcoholic hydroxyl group-containing water-soluble polymer compound and the monomer are added separately, it is preferred to initiate the addition of both almost simultaneously. When the monomer mixture is added alone in a large amount in the first place, agglomerations are liable to occur, on the other hand, when the alcoholic hydroxyl group-containing water-soluble polymer compound is added alone in a large amount in the first place, the viscosity of the polymer system increases or agglomerations are liable to occur. It does not always necessary that they are added at the same time but it is preferred that both be added almost simultaneously.

Of the addition methods of the alcoholic hydroxyl group-containing water-soluble polymer compound and the monomer mixture, a method of blending the alcoholic hydroxyl group-containing water-soluble polymer compound with the monomer mixture and water, dispersing them and adding to a reaction vessel after initiation of polymerization is preferred for capable of obtaining uniform chain distribution of the ethylenically unsaturated acid monomer in the polymer chain of the alkali-soluble copolymer.

An alkali-soluble copolymer which is used for manufacturing the pH-adjusted resin can be prepared by polymerization (preferably emulsion polymerization) of an ethylenically unsaturated carboxylic acid monomer and other monomer copolymerizable with the ethylenically unsaturated carboxylic acid monomer in the presence of a copolymerizable surfactant.

The copolymerizable surfactants which are used for manufacturing the alkali-soluble copolymers are surfactants having 1 or more polymerizable vinyl groups in the molecule. The specific examples of the copolymerizable surfactants include anionic polymerizable surfactants, e.g., sodium propenyl-2-ethylhexylsulfosuccinate, (meth)acrylic acid polyoxyethylene sulfate, polyoxyethylene alkylpropenyl ether sulfate ammonium salt, and (meth)acrylic acid polyoxyethylene ester phosphate; and nonionic surfactants, e.g., polyoxyethylene alkylbenzene ether (meth)acrylate and polyoxyethylene alkyl ether (meth)acrylate. Of these copolymerizable surfactants, polyoxyethylene alkylpropenyl ether sulfate ammonium salt is preferred for being excellent in the emulsion dispersion property of monomers and the balance of copolymerizability with monomers.

The amount of the copolymerizable surfactant used is generally from 0.01 to 5.0 weight parts per 100 weight parts of all the monomers used for the synthesis of the alkali-soluble copolymers, preferably from 0.05 to 5.0 weight parts, and more preferably from 0.1 to 3.0 weight parts. When the amount is less than 0.01 weight parts, emulsification stability lowers, which sometimes results in the generation of a great amount of agglomerations in polymerization. While when the amount is greater than 5.0 weight parts, there are cases where composition of the pH-adjusted resin has a tendency to foam. In addition, in the polymerization of the alkali-soluble copolymers, it is preferred not to use a non-polymerizable surfactant, but when a non-polymerizable surfactant is used, the amount of the non-polymerizable surfactant is generally less than 0.05 weight parts per 100 parts of all the monomers used for the synthesis of the alkali-soluble copolymers. When the amount of a non-polymerizable surfactant increases, the water resistance of the image obtained is liable to lower.

The polymerization initiators which can be used for manufacturing the alkali-soluble copolymers are not particularly restricted. The specific examples of the polymerization initiators include inorganic peroxides, e.g., sodium persulfate, potassium persulfate, ammonium persulfate, potassium perphosphate, and hydrogen peroxide; organic peroxides, e.g., diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide; and azo compounds, e.g., azobisisobutyronitrile, azobis-2,4-dimethylvaleronitrile, and methyl azobisisobutyrate. These polymerization initiators can be used alone or in combination of two or more. Of these compounds, potassium persulfate and ammonium persulfate are preferred.

The amount of the polymerization initiators used varies in accordance with the kinds of polymerization initiators, but the amount is preferably from 0.5 to 5 weight parts per 100 weight parts of all the monomer mixtures used for manufacturing the aqueous dispersion of the alkali-soluble copolymers, and more preferably from 0.8 to 4 weight parts.

These polymerization initiators can also be used as redox polymerization initiators by combination with reducing agents.

The reducing agents of the redox polymerization initiators are not particularly restricted, and the specific examples include compounds containing metallic ions in the state of reduced state, e.g., ferrous sulfate and cuprous naphthenate; sulfonic acid compounds, e.g., sodium methanesulfonate; and amine compounds, e.g., dimethylaniline.

These reducing agents can be used alone or in combination of two or more.

The amount of the reducing agents used varies in accordance with the kinds of the reducing agents, but the amount is preferably from 0.03 to 10 weight parts per 1 weight part of the polymerization initiators.

For adjusting the weight average molecular weight of the alkali-soluble copolymers, chain transfer agents can be used according to necessity in polymerization. The examples of the chain transfer agents include mercaptans, e.g., t-dodecylmercaptan and n-dodecylmercaptan; alpha-methylstyrene dimer; sulfides, e.g., dimethylxanthogen disulfide and diisopropylxanthogen disulfide; nitrile compounds, e.g., 2-methyl-3-butynenitrile and 3-pentenenitrile; thioglycolate, e.g., methyl thioglycolate, propyl thioglycolate, and octyl thioglycolate; and beta-mercaptopropionate, e.g., methyl beta-mercaptopropionate and octyl beta-mercaptopropionate; and they can be used alone or in combination of two or more. Of these chain transfer agents, thioglycolate is preferred, and octyl thioglycolate is more preferred.

When chain transfer agents are used, the amount of the chain transfer agents used is generally from 0.1 to 5 weight parts per 100 weight parts of the monomers used for preparing the alkali-soluble copolymers, and preferably from 0.5 to 4 weight parts. When the amount of chain transfer agents used is too small, the viscosity of the copolymer after neutralization becomes too high and difficult to be handled, and when the amount is too great, the molecular weight sometimes conspicuously lowers. The method of addition of chain transfer agents is not especially limited, and they can be added to a polymer system en bloc, or may be added little by little intermittently or continuously.

The alkali-soluble copolymer is polymerized at a polymerization temperature of generally from 0 to 100° C., preferably from 30 to 90° C. The degree of conversion of the polymerization is generally 90 wt % or more, and preferably 95 wt % or more.

The degree of neutralization in the neutralized product of the alkali-soluble copolymer (the molar equivalent of the inorganic base to the molar equivalent of the ethylenically unsaturated carboxylic acid monomer) for use in the present invention is not particularly limited, but it is generally 70% or more, preferably 95% or more.

The inorganic bases used for neutralizing the alkali-soluble copolymer are not particularly restricted and, alkali metal hydroxides, e.g., sodium hydroxide and potassium hydroxide; and alkaline earth metal hydroxides, e.g., calcium hydroxide and magnesium hydroxide are exemplified. These inorganic bases can be used alone or in combination of two or more. Of these inorganic bases, sodium hydroxide is preferably used. Ammonia can also be used as the inorganic base, but the use of ammonia sometimes results in the reductions of aging stability (e.g., the reduction of pH) and ejection stability of the ink.

Of the alkali-soluble copolymers described above which are used in the present invention, those which can be obtained by polymerization in the presence of the alcoholic hydroxyl group-containing water-soluble polymer compounds are preferred for the reason that viscosity hardly changes and excellent dot-reproducing property can be obtained even when the pH-adjusted resin composition is preserved for a long period of time.

The weight average molecular weight of the pH-adjusted resin used in the present invention is not particularly restricted, but when it is too great (e.g., when it exceeds 50,000), the viscosity of the pH-adjusted resin emulsion becomes high, thus handling is difficult. On the other hand, when the molecular weight is too low (e.g., when it is less than 8,000), friction resistance sometimes deteriorates. The weight average molecular weight of the pH-adjusted resin is preferably 8,000 or more, more preferably from 9,000 to 100,000, and still more preferably from 10,000 to 50,000.

The glass transition temperature of the pH-adjusted resin for use in the present invention can be determined appropriately, and it is preferably from 5 to 50° C., more preferably from 20 to 40° C. When the glass transition temperature of the pH-adjusted resin is in this range, images excellent in bending resistance and blocking resistance can be obtained. Even when the glass transition temperature of the pH-adjusted resin used in the present invention is elevated a little, the film-forming temperature of the ink composition of the present invention is generally left low.

The concentration of the solids content of the pH-adjusted resin used in the black ink composition of the present invention for preventing golden gloss can be 10 wt % or less on the basis of the total weight of the black ink composition, preferably from 0.5 to 8 wt %, and more preferably from 1 to 6 wt %. The resin emulsion is generally used in the state of an aqueous emulsion.

When the ink set of the present invention contains a black ink composition for preventing phase shift, the concentration of the solids content of the pH-adjusted resin used in the black ink composition for preventing phase shift can be 10 wt % or less on the basis of the total weight of the black ink composition, preferably from 0.1 to 8 wt %, and more preferably from 0.3 to 5 wt %. The resin emulsion is generally used in the state of an aqueous emulsion.

The pH-adjusted resin used in the present invention has a pH value of preferably from 8 to 11, more preferably from 9 to 11. When the pH is less than 8, the ejection stability sometimes lowers, and when it is higher than 11, the dispersion stability shows a tendency to deteriorate.

The amount of the alkali-soluble copolymer used in the pH-adjusted resin in the present invention is preferably from 2 to 200 weight parts per 100 weight parts of the colorant, more preferably from 5 to 150 weight parts, and especially preferably from 10 to 100 weight parts.

The black ink composition for preventing golden gloss and the black ink composition for preventing phase shift (when the ink set of the invention contains the black ink composition for preventing phase shift) of the present invention can use a polyalkylene emulsion as the fine particle emulsion as described above.

The solid content of the polyalkylene emulsion in the black ink composition for preventing golden gloss and the black ink composition for preventing phase shift (when this is contained in the ink set of the invention) of the present invention can be 10 wt % or less on the basis of the total weight of the black ink composition, preferably from 0.5 to 8 wt %, and more preferably from 1 to 5 wt %.

The black ink composition for preventing golden gloss and the black ink composition for preventing phase shift (when this is contained in the ink set of the invention) of the present invention preferably contain the emulsion containing the pH-adjusted resin as the resin component and/or the polyalkylene emulsion, more preferably contain both the emulsion containing the pH-adjusted resin as the resin component and the polyalkylene emulsion. The sum total of the solids content of the pH-adjusted resin and the polyalkylene emulsion is preferably from 0.5 wt % to 20 wt % on the basis of the total weight of the black ink composition.

There are cases where the black ink composition for preventing golden gloss and the black ink composition for preventing phase shift (when this is contained in the ink set of the invention) of the present invention contain other resin components. Other resin components mean resin components generally used in manufacturing black ink compositions, e.g., resin dispersants, such as polyvinyl alcohols, polyvinyl pyrrolidones, acrylic resin, e.g., polyacrylic acid, acrylic acid-acrylonitrile copolymer, potassium acrylate-acrylonitrile copolymer, vinyl acetate-acrylic ester copolymer, and acrylic acid-acrylic ester copolymer, styrene-acrylic resin, e.g., styrene-acrylic acid copolymer, styrene-methacrylic acid copolymer, styrene-methacrylic acid-acrylic ester copolymer, styrene-alpha-methylstyrene-acrylic acid copolymer, and styrene-alpha-methylstyrene-acrylic acid-acrylic ester copolymer, styrene-maleic acid copolymer, styrene-maleic anhydride copolymer, vinylnaphthalene-acrylic acid copolymer, vinylnaphthalene-maleic acid copolymer, vinyl acetate copolymers, e.g., vinyl acetate-ethylene copolymer, vinyl acetate-fatty acid vinyl ethylene copolymer, vinyl acetate-maleic ester copolymer, vinyl acetate-crotonic acid copolymer, and vinyl acetate-acrylic acid copolymer, salts of these vinyl acetate copolymers, and resin surfactants, e.g., polyoxyethylene alkyl ether, polyoxyethylene alkyl ester, polyoxyethylene sorbitan fatty acid ester, polyoxyethylene alkylphenyl ether, polyoxyethylene alkylamine and polyoxyethylene alkylamide are exemplified as other resin components.

As carbon blacks which are used in the black ink composition for preventing golden gloss and the black ink composition for preventing phase shift (when this is contained in the ink set of the invention) of the present invention, carbon blacks manufactured by well-known methods, e.g., a contact method, a furnace method and a thermal method can be used, in addition to titanium oxide and iron oxide. The specific examples of carbon blacks which can be used in the present invention include No. 2300, No. 900, HCF88, No. 33, No. 40, No. 45, No. 52, MA7, MA8, MA100 and No. 2200B (manufactured by MITSUBISHI CHEMICAL CORPORATION), Raven 5750, Raven 5250, Raven 5000, Raven 3500, Raven 1255 and Raven 700 manufactured by Columbia Carbon Co., Ltd.), Regal 1400R, Regal 1330R, Regal 660R, Mogul L, Monarch 700, Monarch 800, Monarch 880, Monarch 900, Monarch 1000, Monarch 1100, Monarch 1300 and Monarch 1400 (manufactured by Cabot Co., Ltd.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (manufactured by Degussa Co., Ltd.). However, the present invention is not limited thereto.

In the present invention, carbon blacks subjected to surface treatment by oxidation can be used together with the pH-adjusted resin. It is not necessary to use the above dispersant in this case. Surface treatment can be performed by well-known methods. Hydrophilic groups, e.g., a carbonyl group, a carboxyl group, a hydroxyl group, or a sulfone group can be introduced onto the surfaces of the carbon blacks by oxidation treatment.

The particle size of the carbon blacks is not especially restricted, and it is preferably 10 μm or less, more preferably 0.1 μm or less.

The carbon blacks contained in each black ink composition in the ink set according to the present invention may be the same or different.

The carbon black content in the black ink composition for preventing golden gloss is the amount capable of being used in recording of GG-occurring region, and the specific amount is less than 0.4 wt % on the basis of the total weight of the black ink composition, particularly 0.01 wt % or more and less than 0.4 wt %, preferably from 0.05 to 0.3 wt %, and more preferably from 0.1 to 0.25 wt %.

When the ink set of the invention contains the black ink composition for preventing phase shift, the carbon black content in the black ink composition for preventing phase shift is the amount capable of being used in recording of phase shift-occurring region, and the specific amount is from 0.4 to 1.5 wt %, preferably from 0.5 to 1.2 wt %, and especially from 0.6 to 1.0 wt %.

The black ink composition for preventing golden gloss and the black ink composition for preventing phase shift (when this is contained in the ink set of the invention) can also contain a complementary colorant for making the inherent coloring property of the carbon black (a property of coloring a hyperchromic part with red, or in particular a property of coloring a hypochromic part with yellow) a non-coloring property. The complementary colorant means a colorant contained in the black ink composition for reducing or doing away with coloring generated in a recorded image with black ink, to thereby obtain an achromatic image, e.g., Color Index Pigment Blue 60 (C.I. PB60), Color Index Pigment Blue 15:3 and Color Index Pigment Blue 15:4 can be exemplified as such complementary colorants.

Pigment Blue 60 is preferably used in the black ink composition containing from 0.01 to 1 wt % of carbon black. The amount of Pigment Blue 60 used is not particularly restricted and the amount of, e.g., from 0.01 to 0.5 wt % on the basis of the total weight of the black ink composition is preferred. Color Index Pigment Blue 15:3 and Color Index Pigment Blue 15:4 are respectively preferably used in the black ink composition containing from 1 to 10 wt % of carbon black, and their amounts are not also particularly limited, and the amount of from 0.1 to 5 wt % on the basis of the total weight of the black ink composition is preferred.

The black ink composition for preventing golden gloss of the invention can be prepared as aqueous ink comprising the similar compounding components to conventionally well-known black ink compositions except that the black ink composition is a black ink composition having a low carbon black content, the composition contains a fine particle emulsion (e.g., a pH-adjusted resin and/or a polyalkylene emulsion), and particularly, it contains the fine particle emulsion in an excess amount. Further, the black ink composition can be used as the inks for various well-known recording methods, and preferably it can be used as the ink for ink jet recording.

When the ink set of the invention contains a black ink composition for preventing phase shift, the black ink composition for preventing phase shift can be prepared as aqueous ink comprising the similar compounding components to conventionally well-known black ink compositions except that the black ink composition is a black ink composition for medium gradation, the composition contains a fine particle emulsion (e.g., a pH-adjusted resin and/or a polyalkylene emulsion), and particularly, it contains the fine particle emulsion in an excess amount. Further, the black ink composition can be used as the inks for various well-known recording methods, and preferably it can be used as the ink for ink jet recording.

In the next place, the cases where the ink set of the invention is the ink for ink jet recording, and the black ink composition for preventing golden gloss and each ink composition contained in the ink set of the invention (particularly, the black ink composition for preventing phase shift which is sometimes contained in the ink set of the invention) are aqueous ink composition are described in brief below.

In the black ink composition for preventing golden gloss and/or the black ink composition contained in the ink set of the invention (particularly, the black ink composition for preventing phase shift which is sometimes contained in the ink set of the invention), a carbon black is preferably added to the ink compositions, e.g., as a pigment dispersion obtained by dispersing carbon black in aqueous medium with a dispersant. As the dispersants which are used for preparing a pigment dispersion, dispersants generally used for preparing a pigment dispersion, e.g., polymer dispersants and surfactants can be used.

The amount of the dispersant contained in the black ink composition for preventing golden gloss and/or the ink composition contained in the ink set of the invention (in particular, the black ink composition for preventing phase shift) is not particularly restricted, and the amount is preferably from 0.01 to 10 wt %, more preferably from 0.1 to 5 wt %. When the dispersant content is less than 0.01 wt %, sufficient effect of surface activity cannot be obtained, and when it exceeds 10 wt %, it is confirmed that ejection defects are brought about by precipitation of crystals, formation of liquid crystals or reduction of the stability of pigments.

Besides conventionally used surfactants, the dispersants usually used for preparing pigment dispersions, e.g., polymer dispersants, can be preferably used in the present invention. The technicians in this field well know the dispersants contained in these pigment dispersions also function as the dispersants and surfactants for the black ink composition.

As more preferred dispersants, polymer dispersants, in particular, resin dispersants can be used.

Natural polymers can be exemplified as the preferred examples of polymer dispersants. The specific examples of natural polymers include proteins, e.g., glue, gelatin, casein and albumin, natural rubbers, e.g., gum arabic and tragacanth gum, glucosides, e.g., saponin, alginic acid, alginic acid derivatives, e.g., propylene glycol alginate, triethanolamine alginate, and ammonium alginate, and cellulose derivatives, e.g., methyl cellulose, carboxymethyl cellulose, hydroxyethyl cellulose and ethylhydroxy cellulose.

Synthetic polymers are also included in the preferred examples of polymer dispersants. The specific examples include polyvinyl alcohols, polyvinyl pyrrolidones, acrylic resin, e.g., polyacrylic acid, acrylic acid-acrylonitrile copolymer, acrylate-acrylonitrile copolymer, vinyl acetate-acrylic ester copolymer, and acrylic acid-acrylic ester copolymer, styrene-acrylic resin, e.g., styrene-acrylic acid copolymer, styrene-methacrylic acid copolymer, styrene-methacrylic acid-acrylic ester copolymer, styrene-alpha-methylstyrene-acrylic acid copolymer, and styrene-alpha-methylstyrene-acrylic acid-acrylic ester copolymer, styrene-maleic acid copolymer, styrene-maleic anhydride copolymer, isobutylene-maleic acid resin, rosin-modified maleic acid resin, vinylnaphthalene-acrylic acid copolymer, vinylnaphthalene-maleic acid copolymer, and vinyl acetate copolymers, e.g., vinyl acetate-ethylene copolymer, vinyl acetate-fatty acid vinylethylene copolymer, vinyl acetate-maleic ester copolymer, vinyl acetate-crotonic acid copolymer, and vinyl acetate-acrylic acid copolymer, and salts of these vinyl acetate copolymers.

As the resin dispersant, commercially available products can be used, and the specific examples include JONCRYL 68 (molecular weight: 10,000, acid value: 195), JONCRYL 61J (molecular weight: 10,000, acid value: 195), JONCRYL 680 (molecular weight: 3,900, acid value: 215), JONCRYL 682 (molecular weight: 1,600, acid value: 235), JONCRYL 550 (molecular weight: 7,500, acid value: 200), JONCRYL 555 (molecular weight: 5,000, acid value: 200), JONCRYL 586 (molecular weight: 3,100, acid value: 105), JONCRYL 683 (molecular weight: 7,300, acid value: 150), and JONCRYL B-36 (molecular weight: 6,800, acid value: 250) (manufactured by Johnson Polymer Corporation).

The black ink composition for preventing golden gloss and/or the ink composition contained in the ink set of the invention (in particular, the black ink composition for preventing phase shift) may contain surfactants. The specific examples of surfactants include anionic surfactants (e.g., sodium dodecylbenzenesulfonate, sodium laurate, and ammonium salt of polyoxyethylene alkyl ether sulfate), nonionic surfactants (e.g., polyoxyethylene alkyl ether, polyoxyethylene alkyl ester, polyoxyethylene sorbitan fatty acid ester, polyoxyethylene alkylphenyl ether, polyoxyethylene alkylamine and polyoxyethylene alkylamide), and amphoteric surfactants (e.g., N,N-dimethyl-N-alkyl-N-carboxymethyl ammonium betaine, N,N-dialkylaminoalkylene carboxylate, N,N,N-trialkyl-N-sulfoalkylene ammonium betaine, N,N-dialkyl-N,N-bispolyoxyethylene ammonium sulfate betaine, and 2-alkyl-1-carboxymethyl-1-hydroxyethylimidazolinium betaine). These surfactants can be used alone, or two or more can be used in combination.

It is preferred that the black ink composition for preventing golden gloss and/or the ink composition contained in the ink set of the invention (in particular, the black ink composition for preventing phase shift) contain acetylene glycol surfactant. By the addition of the acetylene glycol surfactant, the permeability of the black ink composition to recording media can be improved, as a result, recording on various recording media with little blotting can be expected. The acetylene glycol surfactant preferably used in the black ink composition of the present invention is a compound represented by the following formula (1):

wherein $0 \leq m+n \leq 50$, $R^1$, $R^2$, $R^3$ and $R^4$ each represents an alkyl group, preferably an alkyl group having 6 or less carbon atoms.

Of the compounds represented by formula (1), 2,4,7,9-tetramethyl-5-decyne-4,7-diol, 3,6-dimethyl-4-octyne-3,6-diol and 3,5-dimethyl-1-hexyne-3-ol are particularly preferred. As the acetylene glycol surfactant represented by formula (1), commercially available products can be used, and the specific examples include Sarfinol 104, 82, 465, 485 and TG (the products of Air Products and Chemicals Inc.), and OLFINE STG and OLFINE E1010 (the products of Nisshin Chemical Industry Co., Ltd.).

It is preferred that the black ink composition for preventing golden gloss and/or the ink composition contained in the ink set of the invention (in particular, the black ink composition for preventing phase shift) contain silicone surfactant represented by the following formula (2). By the addition of the silicone surfactant, the permeability of the black ink composition to recording media can be improved:

(2)

wherein $R^{11}$, $R^{12}$, $R^{13}$, $R^{14}$, $R^{15}$, $R^{16}$ and $R^{17}$ each represents an alkyl group having from 1 to 6 carbon atoms; j and k each represents an integer of 1 or higher; EO represents an ethylene oxy group; PO represents a propylene oxy group; and s and t each represents an integer of 0 or higher, provided that s+t represents an integer of 1 or higher, EO and PO may not be in order in the brackets, and may be random or block.

The preferred compounds of the silicone surfactant represented by formula (2) are compounds represented by formula (2) wherein $R^{11}$ to $R^{17}$ each represents an alkyl group having from 1 to 6 carbon atoms, more preferably a methyl group; j and k each represents an integer of 1 or higher, more preferably 1 or 2; and s and t each represents an integer of 0 or higher, provided that s+t represents an integer of 1 or higher, more preferably s+t represents from 2 to 4.

The particularly preferred compounds of the silicone surfactant represented by formula (2) are compounds represented by formula (2) wherein j and k represent the same number of 1 to 3, in particular 1 or 2. The more preferred are the compounds represented by formula (2) wherein all of $R^{11}$ to $R^{17}$ represent a methyl group; j represents 1, k represents 1, u represents 1, s represents an integer of 1 or higher, in particular, an integer of from 1 to 5, and t represents 0.

The addition amount of the silicone surfactant represented by formula (2) may be arbitrary, but the amount is preferably from 0.03 to 3 wt % on the basis of the total weight of the black ink composition, more preferably from 0.1 to 2 wt %, and more preferably from 0.3 to 1 wt %.

The silicone surfactant represented by formula (2) are commercially available and they can be used in the present invention. For example, silicone surfactant BYK-347 and BYK-348 manufactured by Big Chemie Japan can be used.

The amount of surfactants contained in the black ink composition for preventing golden gloss and/or the ink composition contained in the ink set of the invention (in particular, the black ink composition for preventing phase shift) is not particularly restricted, and the amount is preferably from 0.01 to 10 wt %, and more preferably from 0.1 to 5 wt %. When the amount of surfactants contained is less than 0.01 wt %, sufficient effect of surface activity cannot be obtained, and when it exceeds 10 wt %, it is confirmed that ejection defects are brought about by precipitation of crystals, formation of liquid crystals or reduction of the stability of pigments.

Further, the black ink composition for preventing golden gloss and/or the ink composition contained in the ink set of the invention (in particular, the black ink composition for preventing phase shift) may contain a lubricant, a drying velocity adjusting agent, and/or a water-soluble organic solvent as the stabilizer. The amount of the water-soluble organic solvent added to each black ink composition is preferably from 0.5 to 40 wt % on the basis of the total weight of the black ink composition, more preferably from 2 to 30 wt %.

As the water-soluble organic solvent, water-soluble organic solvents which are blended in generally used water pigment ink compositions can be used. The specific examples of the water-soluble organic solvents include polyhydric alcohols, e.g., ethylene glycol, diethylene glycol, triethylene glycol, tetraethylene glycol, polyethylene glycol, polypropylene glycol, propylene glycol, dipropylene glycol, butylene glycol, 1,2,6-hexanetriol, thioglycol, hexylene glycol, glycerol, trimethylolethane and trimethylolpropane; polyhydric alcohol alkyl ethers, e.g., ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; 2-pyrrolidone, N-methyl-2-pyrrolidone, 1,3-dimethyl-2-imidazolidinone and triethanolamine.

It is preferred that the black ink composition for preventing golden gloss and/or the black ink composition contained in the ink set of the invention (particularly, the black ink composition for preventing phase shift which is sometimes contained in the ink set of the invention) further contain an antiseptic, a sequestering agent, and/or a rust preventive. As the antiseptics, it is preferred to use one or more compounds selected from the group consisting of alkylisothiazolone, chloroalkylisothiazolone, benzisothiazolone, bromonitro-alcohol, oxazolidine compounds and chloroxylenol, as the sequestering agent, ethylenediaminetetraacetate is preferably used, and as the rust preventive, dicyclohexyl ammonium nitrate and/or benzotriazole are(is) preferably used.

The black ink composition for preventing golden gloss and/or the ink composition contained in the ink set of the invention (in particular, the black ink composition for preventing phase shift) may contain a wetting agent, a humectant, an auxiliary solvent, a permeation controller, a viscosity adjustor, a pH adjustor, an antioxidant, an antifungal agent, a corrosion inhibitor and other various additives for the purpose of ensuring storage stability, preventing clogging, ensuring ejection stability and ensuring shelf stability.

In addition to the above compounds, as the ingredients for improving the solubility of ink components, elevating permeability to a recording medium, e.g., paper, and preventing clogging of a nozzle, alkyl alcohols having from 1 to 4 carbon atoms, e.g., ethanol, methanol, butanol, propanol and isopropanol; formamide, acetamide, dimethyl sulfoxide, sorbitol, sorbitan, acetin, diacetin, triacetin and sulforan can be appropriately selected and used.

A pH adjustor, diethanolamine, triethanolamine, propanolamine, amines, e.g., morpholine, and the modified products thereof, inorganic hydroxides, e.g., potassium hydroxide, sodium hydroxide and lithium hydroxide, ammonium hydroxide, quaternary ammonium salt (e.g., tetramethyl ammonium), carbonates, e.g., potassium carbonate, sodium carbonate and lithium carbonate, in addition, phosphate can further be used.

As other additives, ureas, e.g., urea, thiourea and tetramethylurea, allophanates,. e.g., allophanate and methyl allophanate, biurets, e.g., biuret, dimethyl biuret and tetramethyl biuret, L-ascorbic acid and the salts thereof, commercially available antioxidants, and UV absorbers can also be used.

It is preferred that the black ink composition for preventing golden gloss and/or the ink composition contained in the ink set of the invention (in particular, the black ink composition for preventing phase shift) have a surface tension of 45 mN/m or less, more preferably from 25 to 45 mN/m. When the surface tension is higher than 45 mN/m, the drying property at printing deteriorates, as a result, blotting is liable to occur and color bleeding is brought about, thus it is difficult to obtain good recorded images. When the surface tension is less than 25 mN/m, the vicinity of the nozzle of printer head is liable to be wet, thus there easily arises a problem on the ejection stability such that the flying curve of the ink droplet occurs. The surface tension can be measured by a usually used surface tensiometer.

The surface tension of the ink can be brought to the above range by adjusting the kind and the compounding ratio of each component constituting the ink.

The black ink composition for preventing golden gloss contained in the ink set for ink jet recording and the ink composition in the ink set of the invention (in particular, the black ink composition for preventing phase shift) can be prepared according to ordinary methods.

The ink set of the present invention may be an ink set for black-and-white monochromatic recording or may be an ink set for color recording.

Further, it is preferred for the black ink composition for preventing golden gloss and/or the ink composition contained in the ink set of the invention (in particular, the black ink composition for preventing phase shift) to contain tertiary amine as the pH adjustor.

The examples of the tertiary amines which can be added to the black ink composition for preventing golden gloss and/or the ink composition contained in the ink set of the invention (in particular, the black ink composition for preventing phase shift) include trimethylamine, triethylamine, triethanolamine, dimethylethanolamine, diethylethanolamine, triisopropenolamine and butyldiethanolamine. These compounds may be used alone or in combination. The amount of these tertiary amines added to the black ink composition for preventing golden gloss and/or the ink composition contained in the ink set of the invention (in particular, the black ink composition for preventing phase shift) is from 0.1 to 10 wt %, more preferably from 0.5 to 5 wt %.

The black ink composition for preventing golden gloss and/or the ink composition contained in the ink set of the invention (in particular, the black ink composition for preventing phase shift) can also contain a permeation accelerator, sugar, and/or an alginic acid derivative.

As the examples of the permeation accelerators, e.g., alkyl ether derivatives having 3 or more carbon atoms of polyhydric alcohol, e.g., diethylene glycol monobutyl ether, triethylene glycol monobutyl ether, propylene glycol monobutyl ether, and dipropylene glycol monobutyl ether can be exemplified. They can be used alone or in combination of two or more.

As the examples of the sugars, monosaccharide, disaccharide, oligosaccharide (including trisaccharide and tetrasaccharide) and polysaccharide can be exemplified, and the specific examples include glucose, mannose, fructose, ribose, xylose, arabinose, galactose, aldonic acid, glucitol, (sorbitol), maltose, cellobiose, lactose, sucrose, trehalose and maltotriose. Here, polysaccharide means sugar in a broad sense, and used as the meaning including substances which are widely existing in the natural world, e.g., alginic acid, alpha-cyclodextrin and cellulose. As the derivatives of the saccharides, reducing sugars of the saccharides (e.g., sugar-alcohol (represented by formula $HOCH_2(CHOH)_nCH_2OH$, wherein n represents an integer of from 2 to 5)), oxidized saccharides (e.g., aldonic acid and uronic acid), amino acid and thiosugar are exemplified. Sugar-alcohol is particularly preferred, and specifically maltitol and sorbitol are exemplified. As the commercially available product, HS-500 and HS-300 (manufactured by HAYASHIBARA Biochemical Laboratories, Inc.) can be used. The addition amount of these saccharides is preferably from about 0.1 to 40 wt %, and more preferably from about 1 to 30 wt %.

The preferred examples of alginic acid derivatives include alginic acid alkali metal salts (e.g., sodium salt and potassium salt), alginic acid organic salts (e.g., triethanolamine salt), and alginic acid ammonium salt. The addition amount of the alginic acid derivatives to the black ink composition is preferably from about 0.01 to 1 wt %, and more preferably from about 0.05 to 0.5 wt %.

The reason why good images can be obtained by the addition of alginic acid derivative is not clear, but this is probably due to the fact that the polyvalent metal salt in a reaction solution reacts with the alginic acid derivative in a black ink composition, which affects the dispersion state of a colorant and the fixation of the colorant on a recording medium is accelerated.

The black ink composition for preventing golden gloss and/or the ink composition contained in the ink set of the invention (in particular, the black ink composition for preventing phase shift) can also contain, if necessary, an antiseptic, an antifungal agent, and/or a phosphorus antioxidant.

The black ink composition for preventing golden gloss and/or the ink composition contained in the ink set of the invention (in particular, the black ink composition for preventing phase shift) can be prepared according to ordinary methods. For example, they can be prepared by dispersing and blending each component described above by appropriate methods. Preferably, in the first place, a homogeneous pigment dispersion is prepared by blending pigments, a polymer dispersant and ion exchange water in an appropriate disperser (e.g., a ball mill, a sand mill, an attritor, a roll mill, an agitator mill, a Henschel mixer, a colloid mill, an ultrasonic homogenizer, a jet mill, or an ang mill). In the next place, the above fine particle emulsions (in particular, a pH-adjusted resin emulsion and polyalkylene emulsion), ion exchange water, a water-soluble organic solvent, an antiseptic, and/or an antifungal agent are thoroughly stirred at room temperature, to thereby prepare an ink solvent. The pigment dispersion is gradually dripped to the ink solvent in the state of having been thoroughly stirred with a proper disperser, and the mixed solution is sufficiently stirred. After sufficiently stirring, the mixed solution is filtered to eliminate coarse particles and foreign matters which cause clogging, thereby a black ink composition of the object can be obtained. As the polyalkylene emulsion, commercially available products may be used, e.g., AQ593, AQ513 and PEM-17 manufactured by Big Chemie Japan can be utilized.

The black ink composition for preventing golden gloss of the invention can be used in an ink set containing, other than the black ink composition for preventing golden gloss, one or more, preferably two or more, black ink compositions having higher concentration of carbon black than that of the black ink composition for preventing golden gloss. The present invention relates to the ink set containing the black ink composition for preventing golden gloss too. The ink set of the present invention may be an ink set for monochromatic recording or may be an ink set for color recording.

The ink set for monochromatic recording of the invention contains the black ink composition for preventing golden gloss and a black ink composition having higher concentration of carbon black than that of the black ink composition for preventing golden gloss. When the ink set for monochromatic recording of the invention consists of two black ink compositions, the ink set contains the black ink composition for preventing golden gloss and a high concentration black ink composition (ordinary carbon black concentration). When the ink set for monochromatic recording of the invention consists of three black ink compositions, the ink set contains the black ink composition for preventing golden gloss, the black ink composition for medium gradation (particularly, the black ink composition for medium gradation for preventing phase shift), and the black ink composition of high concentration and, if necessary, every black ink contains appropriate complementary colorants. Alternatively, the ink set for monochromatic recording of the invention contains, e.g., the black ink composition for preventing golden gloss, at least one kind of black ink composition having higher concentration of carbon black than that of the black ink composition for preventing golden gloss, and a color ink composition capable of printing complementary colors, e.g., a combination of light magenta and light cyan, or a combination of light magenta, light cyan and light yellow.

Further, the kind and number of the ink composition constituting the ink set of the invention for color recording are not particularly limited so long as the ink set contains the black ink composition for preventing golden gloss of the invention as the constituent of the ink set. As the typical ink sets of the invention, e.g., an ink set comprising five colors of a yellow ink composition, a cyan ink composition, a magenta ink composition, a black ink composition for preventing golden gloss, and a dark black ink composition; an ink set comprising seven colors of a light cyan ink composition and a light magenta ink composition in addition to the above ink set of five colors; an ink set comprising eight colors of a dark yellow ink composition in addition to the above ink set of seven colors; an ink set comprising eight colors of a red ink composition, a green ink composition, and a blue ink composition in addition to the above ink set of five colors; an ink set comprising eight colors of an orange ink composition, a green ink composition, and a blue ink composition in addition to the above ink set of five colors; an ink set comprising eight colors of an orange ink composition, a green ink composition, and a violet ink composition in addition to the above ink set of five colors; and an ink set comprising a black ink composition for medium gradation (particularly, a black ink composition for medium gradation for preventing phase shift) in addition to each of the above ink sets are exemplified.

Ink compositions of "light magenta" and "light cyan" are ink compositions generally obtained by lowering the concentrations of coloring materials of a magenta ink composition and a cyan ink composition respectively for the purpose of improving the image quality of a recorded image by the modulation of densities. The ink composition of "dark yellow" is a yellow ink composition using a coloring material (a pigment) having lower lightness and saturation than those of the yellow ink composition for the purpose of improving the color reproducibility of dark colors in a shadow part. Ink compositions of "red", "orange", "green", "blue" and "violet" are ink compositions which are used as the elements constituting medium colors of yellow, magenta and cyan for the purpose of improving the color reproducibility.

The ink sets of the invention can take the same constitutions as conventionally well-known ink sets, except for containing the black ink composition for preventing golden gloss (and sometimes the black ink composition for preventing phase shift), and can be utilized as the inks for conventionally well-known various recording methods. Preferred ink sets are aqueous system ink sets, in particular, ink sets for ink jet recording.

The recording method of the invention is a recording method of performing recording by ejecting the droplets of ink compositions and adhering the droplets on a recording medium with the ink sets of the present invention. Recording can be suitably effected by mounting on a well-known ink jet printer the ink cartridges holding the ink sets of the invention (ink cartridges holding respective black ink compositions separately), and recording on a recording medium.

Here, as the ink jet recorder, ink jet recorders which are equipped with electrostrictive elements capable of vibration on the basis of electric signals and constituted such that inks containing the ink sets of the invention are ejected by the vibration of the electrostrictive elements are preferably used in the present invention.

Well-known ink cartridges (ink-holding cases) can be preferably used in the invention as the ink cartridges for holding ink sets.

The recorded image in the invention is recorded by the recording method of the present invention, therefore, the occurrence of golden gloss is well prevented. Moreover, when an ink set containing the black ink composition for preventing phase shift is used, the occurrences of golden gloss and phase shift are well prevented at the same time.

The black ink composition for preventing golden gloss (and the black ink composition for preventing phase shift which is sometimes used) of the invention can be used in arbitrary recording methods, e.g., they can be suitably used as aqueous ink for gravure, aqueous ink for flexographic printing or, in particular, aqueous ink for jet recording. It is also possible to use them as aqueous paint.

The black ink composition for preventing golden gloss (and the black ink composition for preventing phase shift which is sometimes used) substantially leaves the resin components of the colorants (particularly pigments) contained in the black ink composition and fine particle emulsion (particularly pH-adjusted resin and polyalkylene emulsion) on the surface of recording media. It is particularly preferred to use the black ink compositions of the invention on recording media which substantially absorb the liquid components of the black ink compositions. These recording media have the average pore diameter of the surface smaller than the average particle size of the pigments. Preferred recording media are recording media comprising an ink-receiving layer having an average pore diameter smaller than the average particle size of the pigments.

As a preferred recording medium, a recording medium comprising a base material having thereon an ink-receiving layer containing a porous pigment can be used. The ink-receiving layer may be an uppermost layer of the recording medium, or may be an intermediate layer having thereon, e.g., a glossy layer. As such a recording medium, a so-called absorption-type (also called a void-type) recording medium containing a porous pigment and a binder resin in the ink-receiving layer, and a so-called swelling-type recording medium containing casein, modified polyvinyl alcohol (PVA), gelatin or a resin such as modified urethane in the ink-receiving layer are known. The black ink composition for preventing golden gloss (and the black ink composition for preventing phase shift which is sometimes used) of the invention can be used in either recording medium.

As the porous pigments which are contained in the ink-receiving layer of the absorption-type recording medium, e.g., silica manufactured by a precipitation method, gel-type silica, or silica manufactured by a gaseous phase method, alumina hydrate, e.g., pseudo boehmite, silica/alumina hybrid sol, smectites clay, calcium carbonate, calcium sulfate, barium sulfate, titanium dioxide, kaolin, Chinese clay, talc, magnesium silicate and calcium silicate can be exemplified, and these pigments may be used alone, or two or more pigments may be used in combination.

The binder resins contained in the ink-receiving layer of the absorption-type recording medium are not particularly restricted so long as they are compounds having binding property and capable of elevating the strength of the ink-receiving layer. For instance, polyvinyl alcohol, silanol-modified polyvinyl alcohol, vinyl acetate, starch, cellulose derivatives, e.g., carboxymethyl cellulose, casein, gelatin, conjugated diene copolymer latex, e.g., styrene-butadiene copolymer, vinyl copolymer latex, e.g., ethylene-vinyl acetate copolymer, and acrylic copolymer latex, e.g., acrylic acid and methacrylic acid polymers are exemplified.

The ink-receiving layers of both absorption-type recording medium and swelling-type recording medium can contain, if necessary, various kinds of additives, e.g., a fixing agent, a fluorescent brightening agent, a water-proofing agent, an antifungal agent, an antiseptic, a dispersant, a surfactant, a thickener, a pH adjustor, a defoaming agent, and/or a water retentive agent.

As the base materials on which an ink-receiving layer is provided, sheet-like matters formed out of paper (including paper subjected to sizing treatment); resin-coated paper manufactured by coating polyethylene, polypropylene or polyester on paper; baryta paper; a thermoplastic resin film, e.g., polyethylene terephthalate, polyethylene and polypropylene; synthetic paper; and synthetic fiber are exemplified.

Particularly preferred recording media are recording media comprising any of the above-described base materials having thereon the above-described ink-receiving layer as the uppermost layer, and these base material and ink-receiving layer preferably have the following physical properties.

As the base material, papers (those containing wood pulp) are preferably used, and the basis weight of the base material is preferably from 100 to 350 g/m$^2$, and more preferably from 180 to 260 g/m$^2$. The thickness of the base material is preferably from 100 to 400 μm, and more preferably from 180 to 260 μm. It is preferred for the ink-receiving layer to contain silica gel according to a wet method, as the porous pigment, of from 50 to 60 wt % in terms of solid content on the basis of the total weight of the ink-receiving layer, and from 30 to 40 wt % of polyvinyl alcohol as the binder resin, in view of the improvement of ink absorption and the fastness of the printed letters. The coating amount of the ink-receiving layer is preferably from 5 to 50 g/m$^2$ in terms of solid content in the light of ink absorption. The thickness of the ink-receiving layer itself is preferably from 10 to 40 μm, and more preferably from 20 to 30 μm.

A recording medium on which recording is performed with the black ink composition for preventing golden gloss (and the black ink composition for preventing phase shift which is sometimes used) of the invention preferably has the average pore diameter of the surface (in particular, the surface of the ink-receiving layer) of 50 nm or less, and more preferably 30 nm or less. When the average pore diameter exceeds 300 nm, pigments permeate into the inside of the ink-receiving layer, so that coloring property sometimes deteriorates.

The black ink composition for preventing golden gloss of the invention can be generally used not only as light black ink for printing a light gray region in combination with one or more dark black ink compositions each having different density, as described above, but also as clear ink. As the case where the combination of the black ink compositions is used as clear ink, e.g., a use for reducing the unevenness of the coating amount of the resin component in a recorded image is exemplified.

EXAMPLES

The present invention will be illustrated in greater detail with reference to the following Examples, but the invention should not be construed as being limited thereto. In the Examples, all the "%" and "parts" are give by weight unless otherwise indicated. The acid values of the copolymers obtained in the following preparation examples were measured according to JIS K 0070.

Preparation Example 1

Preparation of pH-adjusted Resin Emulsion A:

Sixty parts of ethyl methacrylate, 36 parts of methyl methacrylate, 4 parts of methacrylic acid, 3 parts of octyl thioglycolate as the molecular weight-conditioner, 1 part of polyvinyl alcohol, and 280 parts of ion exchange water were stirred and blended, thereby a dispersed product of a monomer mixture was prepared.

Another reaction vessel with a stirrer was charged with 130 parts of ion exchange water and 2 parts of potassium persulfate, the temperature of the reaction vessel was raised to 80° C., and the dispersed product of the monomer mixture was continuously added thereto over 4 hours to perform polymerization. After termination of continuous addition, the polymerized product was subjected to post-reaction at 80° C. for 30 minutes. The degree of conversion by polymerization was 99% or higher.

Subsequently, a 10% aqueous solution of sodium hydroxide of the amount equivalent to sodium hydroxide of the equimolar amount to the methacrylic acid put in the reaction vessel was added to the reaction vessel and subjected to heat treatment at 80° C. for 1 hour, and then an appropriate amount of ion exchange water was added thereto, thereby pH-adjusted resin emulsion A having solid content concentration of 15% was obtained. The acid value of pH-adjusted resin emulsion A was 30.

Examples 1 to 4 and Comparative Examples 1 and 2

(1) Preparation of Black Ink Composition

With respect to eight kinds of black ink compositions shown in Table 1 below, the compounding ingredients of each composition were blended and dispersed with glass beads (diameter: 1.7 mm, 1.5 times (weight) the mixture) in a sand mill (a product of YASUKAWA SEISAKUSYO) for 2 hours, thereby eight kinds of black ink compositions were obtained. That is, one kind of dark black ink composition K1, one kind of black ink composition K2 for medium gradation, and six kinds of light black ink compositions (Examples 1 to 4 and Comparative Example 1 and 2) were obtained. As the water-soluble resin shown in Table 1, styrene-acrylic acid copolymer (molecular weight: 15,000, acid value: 100) was used. AQ593 is a polypropylene emulsion (manufactured by Big Chemie Japan), AQ513 is a polyethylene emulsion (manufactured by Big Chemie Japan), HS500 is a solvent comprising sugar as the main component (a product of HAYASHIBARA SHOJI Inc.), Sarfinol 465 is an acetylene glycol surfactant, BYK348 is a silicone surfactant, and Proxel GXL is an antiseptic (manufactured by Avecia). In Table 1, the unit is wt %. Besides the compounding ingredients, each ink contained pure water to make 100 wt % in all.

As for light cyan ink composition, light magenta ink composition, and yellow ink composition shown in Table 2, ink composition of each color held in the ink cartridge (MC5CL01, a trade name, manufactured by Seiko Epson Corporation) was taken out and used for evaluation.

TABLE 1

|  | K1 | K2 | Ex. 1 | Ex. 2 | Ex. 3 | Ex. 4 | Comp. Ex. 1 | Comp. Ex. 2 |
| --- | --- | --- | --- | --- | --- | --- | --- | --- |
| Carbon black | 2.5 | 0.8 | 0.2 | 0.12 | 0.2 | 0.2 | 0.2 | 0.2 |
| Pigment Blue 60 | — | — | — | 0.1 | 0.1 | — | — | — |
| Water-soluble resin (dispersant) | 1.3 | 0.4 | 0.1 | 0.1 | 0.15 | 0.1 | 0.1 | 0.1 |
| pH-adjusted resin emulsion A (solid content: 15%) | — | 2 | 13.3 | 13.3 | 13.3 | 33.5 | 6.7 | — |
| AQ 593 (solid content: 30%) | — | 6.7 | 9.9 | 9.9 | — | — | 6.7 | 9.9 |
| AQ 513 (solid content: 33%) | — | — | — | — | 10 | — | — | — |
| HS500 (a product of HAYASHIBARA SHOJI Inc.) | 2 | 5 | 5 | 6 | 4 | 2 | 5 | 5 |
| Glycerol | 18 | 19 | 17 | 15 | 18 | 16 | 20 | 21 |
| Triethanolamine | 0.9 | 0.9 | 0.9 | — | 0.9 | 0.6 | 0.9 | 0.9 |
| Tripropanolamine | — | — | — | 0.5 | — | — | — | — |
| 1,2-Hexanediol | 5 | 5 | 5 | 5 | — | 5 | 5 | 5 |
| Triethylene glycol monobutyl ether | — | — | — | — | 5 | — | — | — |
| Sarfinol 465 | — | — | — | — | 1 | — | — | — |
| BYK348 | 0.5 | 0.5 | 0.5 | 0.5 | — | 0.5 | 0.5 | 0.5 |
| Proxel GXL | 0.1 | 0.1 | 0.1 | 0.1 | 0.1 | 0.1 | 0.1 | 0.1 |
| EDTA | 0.02 | 0.02 | 0.02 | 0.02 | 0.02 | 0.02 | 0.02 | 0.02 |

(2) Recording Method

Eight kinds of black ink compositions prepared in the above item (1) were respectively filled in a black ink chamber (dark black ink composition K1) of a special purpose cartridge of an ink jet printer (MC2000, manufactured by Seiko Epson Corporation), a cyan ink chamber (black ink composition K2 for medium gradation), and a magenta ink chamber (six kinds of light black ink compositions prepared in Examples 1 to 4 and Comparative Examples 1 and 2). In the similar manner, the light cyan ink composition, the light magenta ink composition, and yellow ink composition were respectively filled in the ink chambers shown in Table 2 below.

TABLE 2

| Ink Composition Used | Ink Chamber Used |
| --- | --- |
| Dark black ink composition K1 | Black ink chamber |
| Black ink composition K2 for medium gradation | Cyan ink chamber |
| Light black ink compositions prepared in Examples 1 to 4 and Comparative Examples 1 and 2 | Magenta ink chamber |
| Light cyan ink composition | Light cyan ink chamber |
| Light magenta ink composition | Light magenta ink chamber |
| Yellow ink composition | Yellow ink chamber |

With respect to six kinds of ink set formed with every composition of six kinds of light black ink compositions filled in the magenta chamber, a stepless gradation pattern from white to black (a gray scale) was outputted on the special purpose recording medium (MC photographic paper, manufactured by Seiko Epson Corporation) without marking off the gradation. Output was performed by apportioning the discharge amount of each ink.

(3) Evaluation of Confirmation of Golden Gloss

Evaluation of golden gloss was performed by five observers. The outputted recorded matter was put on a desk just under a fluorescent lamp, which is room light, with a distance of 1.5 m, and the observers stood by the desk. The observers observed the printed matter with moving their eyes at various visual angles from the right end to the left end of the printed matter in an upright position so as not to intercept the light. The results of the observation obtained are shown in Table 3 below. In the printed matter on which golden gloss occurs, the light of fluorescent lamp strongly reflects and glows gold at a black output color in the range around 140 of gray level when observation is performed with the eyes at a certain angle. In Table 3, the denominator shows the number of all the observers (5 persons in all) and numerator shows the number of persons who confirmed golden gloss.

TABLE 3

|  | Example 1 | Example 2 | Example 3 | Example 4 | Comparative Example 1 | Comparative Example 2 |
| --- | --- | --- | --- | --- | --- | --- |
| Evaluation of confirmation of GG | 0/5 | 0/5 | 0/5 | 0/5 | 4/5 | 4/5 |

Examples 5 to 11 and Comparative Examples 3 and 4

(1) Preparation of Black Ink Composition

With respect to eleven kinds of black ink compositions shown in Table 4 below, the compounding ingredients of each composition were blended and dispersed with glass beads (diameter: 1.7 mm, 1.5 times (weight) the mixture) in a sand mill (a product of YASUKAWA SEISAKUSYO) for 2 hours, thereby eleven kinds of black ink compositions were obtained. That is, one kind of dark black ink composition K1, one kind of light black ink composition K3, and nine kinds of black ink compositions for medium gradation (Examples 5 to 11 and Comparative Example 3 and 4) were obtained. As the water-soluble resin shown in Table 4, styrene-acrylic acid copolymer (molecular weight: 15,000, acid value: 100) was used. AQ593 is a polypropylene emulsion (manufactured by Big Chemie Japan), Lacstar 3307B is a fine particle emulsion of styrene-butadiene copolymer, and Lacstar 3307B and styrene-butadiene-methacrylic acid resin (MBS resin) are shown in Table 4 as solid content, HS500 is a solvent comprising sugar as the main component (a product of HAYASHIBARA SHOJI Inc.), Sarfinol 465 is an acetylene glycol surfactant, BYK348 is a silicone surfactant, and Proxel GXL is an antiseptic (manufactured by Avecia). In Table 4, the unit is wt %. Besides the compounding ingredients, each ink contained pure water to make 100 wt % in all.

respectively filled in the ink-chambers shown in Table 5 below.

TABLE 5

| Ink Composition Used | Ink Chamber Used |
|---|---|
| Dark black ink composition K1 | Black ink chamber |
| Black ink composition for medium gradation prepared in Examples 5 to 11 and Comparative Examples 3 and 4 | Cyan ink chamber |
| Light black ink composition K3 | Magenta ink chamber |
| Light cyan ink composition | Light cyan ink chamber |
| Light magenta ink composition | Light magenta ink chamber |
| Yellow ink composition | Yellow ink chamber |

As for light cyan ink composition, light magenta ink composition, and yellow ink composition shown in Table 5, ink composition of each color held in the ink cartridge (MC5CL01, a trade name, manufactured by Seiko Epson Corporation) was taken out and used for evaluation.

With respect to nine kinds of ink set formed with every composition of nine kinds of black ink compositions for medium gradation filled in the cyan chamber, a stepless gradation pattern from white to black (a gray scale) was outputted on the special purpose recording medium (MC photographic paper, manufactured by Seiko Epson Corporation)

TABLE 4

| | K1 | K3 | Ex. 5 | Ex. 6 | Ex. 7 | Ex. 8 | Ex. 9 | Ex. 10 | Ex. 11 | Comp. Ex. 3 | Comp. Ex. 4 |
|---|---|---|---|---|---|---|---|---|---|---|---|
| Carbon black | 2.5 | 0.2 | 0.8 | 0.75 | 0.7 | 0.8 | 0.8 | 0.8 | 0.75 | 0.8 | 0.8 |
| Pigment Blue 60 | — | — | — | 0.22 | 0.2 | — | — | — | — | — | — |
| Water-soluble resin (dispersant) | 1.3 | 0.1 | 0.4 | 0.5 | 0.5 | — | 0.4 | 0.4 | 0.4 | 0.4 | 0.4 |
| pH-adjusted resin emulsion A (solid content: 15%) | — | 13.3 | 2 | 2 | 6.7 | 13.3 | — | — | — | 1 | — |
| AQ 593 (solid content: 30%) | — | 9.9 | 6.7 | 6.7 | 3.3 | — | 6.7 | — | — | 3.3 | — |
| Lacstar 3307B (addition amount in solid content) | — | — | — | — | — | — | — | 1.6 | — | — | 0.8 |
| Styrene-butadiene-methacrylic acid resin (MBS) | — | — | — | — | — | — | — | — | 1.5 | — | — |
| HS500 (a product of HAYASHIBARA SHOJI, Inc.) | 2 | 5 | 5 | 5 | 4 | 4 | 5 | 5 | 5 | 5 | 5 |
| Glycerol | 18 | 17 | 19 | 18 | 20 | 17 | 19 | 19 | 18 | 21 | 19 |
| Triethanolamine | 0.9 | 0.9 | 0.9 | 0.9 | 0.9 | 0.9 | 0.9 | 0.9 | 0.9 | 0.9 | 0.9 |
| 1,2-Hexanediol | 5 | 5 | 5 | 5 | — | 5 | 5 | 5 | 5 | 5 | 5 |
| Triethylene glycol monobutyl ether | — | — | — | — | 5 | — | — | — | — | — | — |
| Sarfinol 465 | — | — | — | — | 1 | — | — | — | — | — | — |
| BYK348 | 0.5 | 0.5 | 0.5 | 0.5 | — | 0.5 | 0.5 | 0.5 | 0.5 | 0.5 | 0.5 |
| Proxel GXL | 0.1 | 0.1 | 0.1 | 0.1 | 0.1 | 0.1 | 0.1 | 0.1 | 0.1 | 0.1 | 0.1 |
| EDTA | 0.02 | 0.02 | 0.02 | 0.02 | 0.02 | 0.02 | 0.02 | 0.02 | 0.02 | 0.02 | 0.02 |

(2) Recording Method

Eight kinds of black ink compositions prepared in the above item (1) were respectively filled in a black ink chamber (dark black ink composition K1) of a special purpose cartridge of an ink jet printer (MC2000, manufactured by Seiko Epson Corporation), a cyan ink chamber (nine kinds of black ink compositions for medium gradation prepared in Examples 5 to 11 and Comparative Examples 3 and 4), and a magenta ink chamber (light black ink composition K3). In the similar manner, the light cyan ink composition, the light magenta ink composition, and yellow ink composition were without marking off the gradation. Output was performed by apportioning the discharge amount of each ink.

(3) Evaluation of Confirmation of Phase Shift

Evaluation of phase shift was performed by five observers. The outputted recorded matter was put on a desk just under a fluorescent lamp, which is room light, with a distance of 1.5 m, and the observers stood by the desk. The observers observed the printed matter with moving their eyes at various visual angles from the right end to the left end of the printed matter in an upright position so as not to intercept the light. The results of the observation obtained are shown in Table 6 below. In the printed matter on which phase shift occurs, the light of fluorescent lamp strongly reflects and glows white and seems as if reversal is occurring at a black output color in the range of from 40 to 60 of gray level when observation is performed with the eyes at a certain angle. In Table 6, the denominator shows the number of all the observers (5 persons in all) and numerator shows the number of persons who confirmed phase shift.

TABLE 6

| | Example 5 | Example 6 | Example 7 | Example 8 | Example 9 | Example 10 | Example 11 | Comparative Example 3 | Comparative Example 4 |
|---|---|---|---|---|---|---|---|---|---|
| Evaluation of confirmation of GG | 0/5 | 0/5 | 0/5 | 0/5 | 0/5 | 2/5 | 2/5 | 4/5 | 5/5 |

By using the black ink composition for preventing golden gloss of the present invention, the occurrence of golden gloss can be well done away with or prevented in a recorded image. When an ink set containing the black ink composition for preventing golden gloss is used, the occurrence of golden gloss is done away with or prevented, and a good black-and-white monochromatic image and gray scale can be obtained. Further, the quality of an achromatic part of a color image can be elevated by the ink set for color recording.

Moreover, when the ink set of the invention contains the black ink composition for preventing phase shift, the occurrences of golden gloss and phase shift are got rid of or prevented at the same time, and a good black-and-white monochromatic image and gray scale can be obtained. Further, the quality of an achromatic part of a color image can be further elevated by the ink set for color recording.

While the present invention has been described in detail and with reference to specific embodiments thereof, it will be apparent to one skilled in the art that various changes and modifications can be made therein without departing from the spirit and scope thereof.

What is claimed is:

1. A black ink composition comprising (1) water, (2) carbon black, and (3) a fine particle emulsion,
    wherein (A) the content of said carbon black is less than 0.4 wt %, and
    wherein (B) the solid content of said fine particle emulsion is 20 times or more the content of said carbon black,
    wherein said fine particle emulsion comprises a polyalkylene emulsion, an emulsion containing a pH-adjusted resin as a resin component or both and
    wherein said pH-adjusted resin is obtained by a process comprising the steps of:
    polymerizing an ethylenically unsaturated carboxylic acid monomer and another monomer copolymerizable with said ethylenically unsaturated carboxylic acid monomer in the presence of an alcoholic hydroxyl group-containing water-soluble polymer compound or a copolymerizable surfactant to give a copolymer having an acid value of 40 or less; and
    adjusting the pH of said copolymer with an inorganic base.

2. The black ink composition according to claim 1, wherein the content of said carbon black is 0.01 wt % to less than 0.4 wt %.

3. The black ink composition according to claim 1, wherein said inorganic base used for preparing said pH-adjusted resin is an alkali metal hydroxide or an alkaline earth metal hydroxide.

4. The black ink composition according to claim 1, wherein said alcoholic hydroxyl group-containing water-soluble polymer compound used for preparing said pH-adjusted resin is a vinyl alcohol polymer.

5. The black ink composition according to claim 1, wherein said ethylenically unsaturated carboxylic acid monomer used for preparing said pH-adjusted resin is an acrylic acid or a methacrylic acid.

6. The black ink composition according to claim 1, wherein said monomer copolymerizable with said ethylenically unsaturated carboxylic acid monomer used for preparing said pH-adjusted resin is an ethylenically unsaturated carboxylate monomer.

7. The black ink composition according to claim 1, wherein the pH of said emulsion containing the pH-adjusted resin as a resin component is from 8 to 11.

8. The black ink composition according to claim 1, wherein said polyalkylene emulsion is a polyethylene emulsion or a polypropylene emulsion.

9. The black ink composition according to claim 1, wherein the total content of the solids content of said pH-adjusted resin and said polyalkylene emulsion is from 0.5 wt % to 20 wt % on the basis of the total weight of the black ink composition.

10. The black ink composition according to claim 1, further comprising a complementary colorant.

11. The black ink composition according to claim 1, which is an ink composition for ink jet recording.

12. An ink set comprising (a) a black ink composition comprising (1) water, (2) carbon black, and (3) a fine particle emulsion, wherein (A) the content of said carbon black is less than 0.4 wt %. and wherein (B) the solid content of said fine particle emulsion is 20 times or more the content of said carbon black and (b) a black ink composition having a higher carbon black concentration and being darker than said black ink composition.

13. The ink set according to claim 12, comprising:
    a black ink composition comprising (1) water, (2) carbon black, and (3) a fine particle emulsion,
    wherein (A) the content of said carbon black is less than 0.4 wt %, and
    wherein (B) the solid content of said fine particle emulsion is 20 times or more the content of said carbon black;
    a black ink composition for medium gradation containing carbon black in an amount of from 0.4 wt % to 1.5 wt % on the basis of the total weight of the black ink composition for medium gradation; and
    a darker black ink composition containing carbon black in an amount of from 1.5 wt % to 10 wt % on the basis of the total weight of the darker black ink composition.

14. The ink set according to claim 13, wherein the black ink composition for medium gradation comprises:

a black ink composition containing carbon black in an amount of from 0.4 to 1 wt %;

a black ink composition containing carbon black in an amount of from 1 to 1.5 wt %, or both.

15. The ink set according to claim 13, wherein the black ink composition for medium gradation contains a fine particle emulsion, and the solid content of said fine particle emulsion is 2 times or more the content of the carbon black contained therein.

16. The ink set according to claim 15, wherein said fine particle emulsion of said black ink composition for medium gradation comprises a polyalkylene emulsion, an emulsion containing a pH-adjusted resin as a resin component or both,
wherein said pH-adjusted resin is obtained by a process comprising the steps of:

polymerizing an ethylenically unsaturated carboxylic acid monomer and another monomer copolymerizable with said ethylenically unsaturated carboxylic acid monomer in the presence of an alcoholic hydroxyl group-containing water-soluble polymer compound or a copolymerizable surfactant to give a copolymer having an acid value of 40 or less; and adjusting the pH of said copolymer with an inorganic base.

17. A recording method of performing recording by ejecting a droplet of an ink composition to attach the droplet on a recording medium by using an ink set according to claim 12.

18. A recorded matter which is recorded by a recording method according to claim 17.

* * * * *